(12) United States Patent
Nystad (10) Patent No.: US 10,474,427 B2
(45) Date of Patent: Nov. 12, 2019

(54) COMPARISON OF WIDE DATA TYPES

(71) Applicant: ARM Limited, Cambridge, Cambridgeshire (GB)

(72) Inventor: Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/743,008

(22) PCT Filed: May 25, 2016

(86) PCT No.: PCT/GB2016/051506
§ 371 (c)(1),
(2) Date: Jan. 9, 2018

(87) PCT Pub. No.: WO2017/009596
PCT Pub. Date: Jan. 19, 2017

(65) Prior Publication Data
US 2019/0087155 A1    Mar. 21, 2019

(30) Foreign Application Priority Data
Jul. 10, 2015    (GB) .................... 1512140.3

(51) Int. Cl.
*G06F 7/02* (2006.01)
*G06F 9/30* (2018.01)

(52) U.S. Cl.
CPC ............. *G06F 7/02* (2013.01); *G06F 9/3005* (2013.01); *G06F 9/30018* (2013.01); *G06F 9/30021* (2013.01); *G06F 9/30149* (2013.01)

(58) Field of Classification Search
None
See application file for complete search history.

(56) References Cited

U.S. PATENT DOCUMENTS

| | | | |
|---|---|---|---|
| 5,226,082 A | 7/1993 | Kustka | |
| 6,384,627 B1 | 5/2002 | Fross et al. | |
| 6,384,713 B1 | 5/2002 | Yu | |
| 7,453,286 B1 | 11/2008 | Carrillo et al. | |

(Continued)

OTHER PUBLICATIONS

Examination Report dated Oct. 22, 2018 in GB Application No. 1512140.3, 4 pages.

(Continued)

*Primary Examiner* — Michael D. Yaary
(74) *Attorney, Agent, or Firm* — Nixon & Vanderhye P.C.

(57) ABSTRACT

There is provided an apparatus and method for comparing wide data types. The apparatus comprises processing circuitry to perform a plurality of comparison operations in order to compare a first value and a second value, each of the first value and the second value having a length greater than N bits, and each comparison operation operating on a corresponding N bits of the first and second values. The plurality of comparison operations are chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

19 Claims, 9 Drawing Sheets

(56) References Cited

U.S. PATENT DOCUMENTS

| | | | |
|---|---|---|---|
| 8,581,624 B2* | 11/2013 | Cashman | H03K 19/17728 |
| | | | 326/38 |
| 9,176,733 B2* | 11/2015 | Henry | G06F 9/22 |
| 2005/0091234 A1 | 4/2005 | Hsu et al. | |
| 2012/0130983 A1 | 5/2012 | Ryan et al. | |
| 2013/0097408 A1 | 4/2013 | Seal et al. | |

OTHER PUBLICATIONS

International Search Report and Written Opinion of the ISA for PCT/GB2016/051506 dated Oct. 18, 2016, 10 pages.
Combined Search and Examination Report for GB1512140.3 dated Oct. 30, 2015, 6 pages.
Examination Report for GB Application No. 1512140.3 dated Jun. 4, 2019, 3 pages.

* cited by examiner

| Value | Meaning |
|---|---|
| 0 | Signed-greater-than |
| 1 | Signed-greater-than-or-equal |
| 2 | Unsigned-greater-than |
| 3 | Unsigned-greater-than-or-equal |
| 4 | Equal |
| 5 | Not-equal |
| 6-7 | Reserved |

FIG. 3

| Value | Meaning |
|---|---|
| 0 | Reserved |
| 1 | Unsigned less than |
| 2 | Unsigned greater than |
| 3 | Equal |

FIG. 4

| Reserved [31:6] | M1 | Accumulated comparison result [4:3] | cmpf [2:0] |

FIRST                                                      LAST

00110.... ....                                        .... ....01

ICMP32 I
ICMP32 M
ICMP32 M
ICMP32 M
ICMP32 M
ICMP32 M

CONDITIONAL BRANCH

ICMP32 M
ICMP32 M
ICMP32 M
ICMP32 M
ICMP32 M
ICMP32 M
ICMP32 F

COMPARISON OF WIDE DATA TYPES

This application is the U.S. national phase of International Application No. PCT/GB2016/051506 filed May 25, 2016 which designated the U.S. and claims priority to GB Patent Application No. 1512140.3 filed Jul. 10, 2015, the entire contents of each of which are hereby incorporated by reference.

The present technique relates to the field of data processing. In particular, the present technique relates to the field of comparing wide data types.

It is often desirable to perform a comparison between two data values, such as integers. In a data processing apparatus, an instruction may be issued to perform a comparison between two data values. The instruction may indicate two locations of the values to be performed. However, the data processing apparatus may be limited in terms of the size of data values that it can store. For example, each register, which may be used to store a single value, may only be capable of storing a single 32-bit value. Accordingly, such a comparison instruction may normally only be capable of comparing two 32-bit values.

If it is desired to perform a comparison on much wider numbers, i.e. numbers that require more than 32 bits to be represented, then this can be achieved by splitting each number up into multiple chunks and then performing a comparison on each chunk. The individual results of each comparison can then be analysed in order to produce an end result. However, this process requires storage in order to store the individual results. The need for storage can be avoided by arranging each individual comparison in a branching structure. However, this can result in a much larger code sequence and due to branch prediction causing mispredictions, can result in code that takes longer to execute than if storage were used to store the individual results.

Viewed from a first example configuration, there is provided processing circuitry to perform a plurality of comparison operations in order to compare a first value and a second value, each of the first value and the second value having a length greater than N bits, and each comparison operation operating on a corresponding N bits of the first and second values; the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

Viewed from a second example configuration, there is provided a method comprising the steps: performing a plurality of comparison operations in order to compare a first value and a second value, each of the first value and the second value having a length greater than N bits, and each comparison operation operating on a corresponding N bits of the first and second values; the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

Viewed from a third example configuration, there is provided an apparatus comprising: processing means for performing a plurality of comparison operations in order to compare a first value and a second value, each of the first value and the second value having a length greater than N bits, and each comparison operation operating on a corresponding N bits of the first and second values; the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

The present technique will be described further, by way of example only, with reference to embodiments thereof as illustrated in the accompanying drawings, in which.

Before discussing the embodiments with reference to the accompanying Figures, the following description of embodiments and associated advantages is provided.

In accordance with one example configuration there is provided processing circuitry to perform a plurality of comparison operations in order to compare a first value and a second value, each of the first value and the second value having a length greater than N bits, and each comparison operation operating on a corresponding N bits of the first and second values; the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

In the above configuration, a comparison of the first value and the second value (each having more than N bits) is performed by performing a plurality of comparison operations, each of which operates on N bits of the first value and the corresponding N bits of the second value. Each of the comparison operations considers a different set of N bits. The comparison operations are chained. In other words, with the exception of the last comparison operation, each comparison operation provides an Accumulated Comparison Result (ACR), which is used by the next comparison operation in the sequence. The ACR thereby considers the result of the comparison up until the most recently executed comparison operation. For example, if X comparison operations have been performed, each comparing N bits of the first value and N bits of the second value, then the ACR of the comparison operation X represents the result of comparing the first XN bits of the first value and the first XN bits of the second value. The last comparison operation has no successor and so does not output an ACR. Instead, the final comparison operation provides a comparison result, which represents the result of comparing the first value and the second value.

By chaining the comparison operations in this manner, the need for storage of intermediate results can be reduced and in some instances may be eliminated altogether. Furthermore, this chaining of the comparison operations does not necessitate branching or long complex code structures because an ACR is passed between the comparison operations. Accordingly, a comparison of two wide data types can be efficiently carried out, without requiring large amounts of storage and without increasing the size and complexity of the underlying code. This results in a better computer by performing comparisons of wide data types more efficiently.

In some embodiments, the processing circuitry is arranged, for at least each comparison operation after a first comparison operation in the sequence, to receive a descriptor for use as an input for that comparison operation; and the descriptor comprises the accumulated comparison result from a previous comparison operation in the sequence. The descriptor is used to pass intermediate data between successive comparison operations and thereby avoid the need to store large amounts of intermediate data for each of the comparison operations.

There are a number of ways in which the descriptor may be provided for each of the comparison operations. In some embodiments, the processing circuitry is responsive to a plurality of comparison instructions to perform the plurality of comparison operations, at least each comparison instruction other than a first comparison instruction identifying the descriptor in an input parameter. Accordingly, the instructions themselves may either contain the descriptor as a parameter or may contain a parameter that contains a reference to where the descriptor is located (in, for example, storage circuitry such as a register). In other words, the descriptor may be explicitly provided. In some other embodiments, the processing circuitry is responsive to a plurality of comparison instructions to perform the plurality of comparison operations, each of the plurality of comparison operations other than the final comparison operation providing the accumulated comparison result for use as the input by the next comparison operation in the sequence by updating the descriptor stored in the storage circuitry. In these embodiments, the descriptor is implicitly provided, and the processing circuitry is able to locate the descriptor without being told explicitly where to find it. For example, a special dedicated storage structure may be provided in which to store the descriptor.

In some embodiments, the plurality of comparison instructions includes a chained compare instruction; and the processing circuitry is responsive to the chained compare instruction to perform an associated comparison operation in the sequence, the associated comparison operation using as inputs the N bits of the first and second values to be operated on, and an input descriptor, and the processing circuitry is arranged to output, as a result of the associated comparison operation, the descriptor to be used as an input for a subsequent comparison operation. The chained compare instruction itself may be optional in certain circumstances. For example, if the first value and the second value each comprise 2N bits, and each comparison operation operates on N bits, then it may be possible to perform the comparison of the first value and the second value by using only a first chained compare instruction and a final chained compare instruction (each described below). In one embodiment, the chained compare instruction specifies all the inputs of the associated comparison operation as input operands.

In some embodiments, the plurality of comparison instructions includes a final chained compare instruction; and the processing circuitry is responsive to the final chained compare instruction to perform the final comparison operation in the sequence, the final comparison operation using as inputs the N bits of the first and second values to be operated on, and an input descriptor, and the processing circuitry is arranged to output, as a result of the final comparison operation, a comparison result for a comparison of the first and second values. The final chained compare instruction is the final compare instruction in the sequence and produces the overall result of comparing the first value and the second value. In one embodiment, the final chained compare instruction specifies all the inputs of the final comparison operation as input operands.

In some embodiments, the plurality of comparison instructions includes a first chained compare instruction; and the processing circuitry is responsive to the first chained compare instruction to perform the first comparison operation, the first comparison operation using as inputs the N bits of the first and second values to be operated on, and the processing circuitry is arranged to output, as a result of the first comparison operation, the descriptor to be used as an input for a subsequent comparison operation. Such a first chained compare instruction is optional and may instead be replaced by the chained compare instruction in which the descriptor that is provided has an ACR indicating that the comparison of the bits so far has been equal. However, by using a first chained compare instruction rather than providing a chained compare instruction as the first instruction, it is possible to avoid providing an instruction embedded constant or spending an instruction to preload an initial ACR value into the chained compare instruction. In one embodiment, the first chained compare instruction specifies all the inputs of the first comparison operation as input operands.

In some embodiments, a comparison function is provided as an input to the plurality of comparison operations, wherein the comparison function defines a type of comparison to be performed between the first value and the second value. The type of comparison may, for example, indicate that the comparison is to consider the first value and the second value as signed or unsigned numbers. Separately, the type of the comparison may indicate that the comparison is to determine whether the first value is greater than the second value, greater than or equal to the second value, equal to the second value, or not equal to the second value. The type of the comparison may also indicate that the comparison is to consider whether the first value is less than the second value or whether it is less than or equal to the second value.

There are a number of ways in which the comparison function may be provided to the plurality of comparison operations. In some embodiments, the comparison function is provided as an input to the first comparison operation; and the descriptor provided for use as an input by each comparison operation other than the first comparison operation identifies the comparison function provided for use as an input to the first comparison operation. In some other embodiments, the comparison function is provided for use as an input by the final comparison operation in the sequence. The ACR may be determined by each comparison operation without knowledge of how the first value and the second value are to be compared to each other, which is defined by the comparison function. The ACR may therefore provide an indication of how the first value and the second value differ from each other and only when the final comparison operation is performed is the comparison function used to determine whether the difference between the first value and the second value falls within the scope of what is being asked by the comparison function itself. This process may be advantageous in that it can be used to reduce the size of the descriptor, since the comparison function need not be provided until the final comparison operation is to be performed. This may therefore reduce the storage requirements for storing the descriptor whilst other comparison instructions are executed.

In some embodiments, the first value and the second value are both integers. In other embodiments, the first value and the second value are both floating point numbers. It may also be possible to compare other types and compare different types (e.g. an integer with a floating point number).

Although the first value and the second value may have a size that is any number of bits, in some embodiments, the first value and the second value each have a length that is a multiple of N bits. The bits of the first value and the second value may thereby be exactly divided between the multiple comparison operations. In other embodiments, one of the comparison operations (typically the first or last operation) may be extended in order to make up the shortfall in the number of bits. For example, if N is 32, then a 38-bit number may require two comparison operations. One of the operations could operate on 32 bits and the other operation could operate on the remaining 6 bits, extended to 32 bits.

In some embodiments, each comparison operation other than a first comparison operation in the sequence operates on more significant bits of the first and second values than the previous comparison operation. The comparison operations may therefore operate from the least significant bits to the most significant bits across successive comparison operations. Performing the comparison from the least significant bits to the most significant bits may be useful in the case where one of the comparison inputs is a multi-width addition result produced by a chain of add-with-carry instructions. In such a case, it is possible to feed the result of the addition into the comparison one step at a time, without storing the result anywhere.

In other embodiments, each comparison operation other than a first comparison operation in the sequence operates on less significant bits of the first and second values than the previous comparison operation. The comparison operations may therefore operate from the most significant bits to the least significant bits.

In some of these embodiments, the processing circuitry is responsive to the accumulated comparison result indicating a predetermined condition to perform an early branch operation that causes subsequent comparison operations in the sequence to be bypassed. When comparing bits from most significant to least significant, it may be possible to determine the result of the comparison after only comparing a small number of bits. For example, if the comparison is to determine which of two unsigned numbers is the biggest and the first value has a '1' for its most significant bit and the second value has a '0' for its most significant bit, then the result of the comparison is already known (the first value is bigger). Accordingly, it may be desirable to insert an early branch instruction within the set of comparison operations to see if the result is known early and to bypass the remaining comparison operations if necessary. This may, in some circumstances, prevent the execution of unnecessary instructions.

The previously mentioned predetermined condition may be based on whether the accumulated comparison result indicates equality of bits compared by previous comparison operations. For example, whether or not the bits of the first value and the second value that have been compared so far are equal will determine whether or not the result of the comparison is known early and therefore whether or not subsequent comparison operations can be bypassed.

Figure 1:
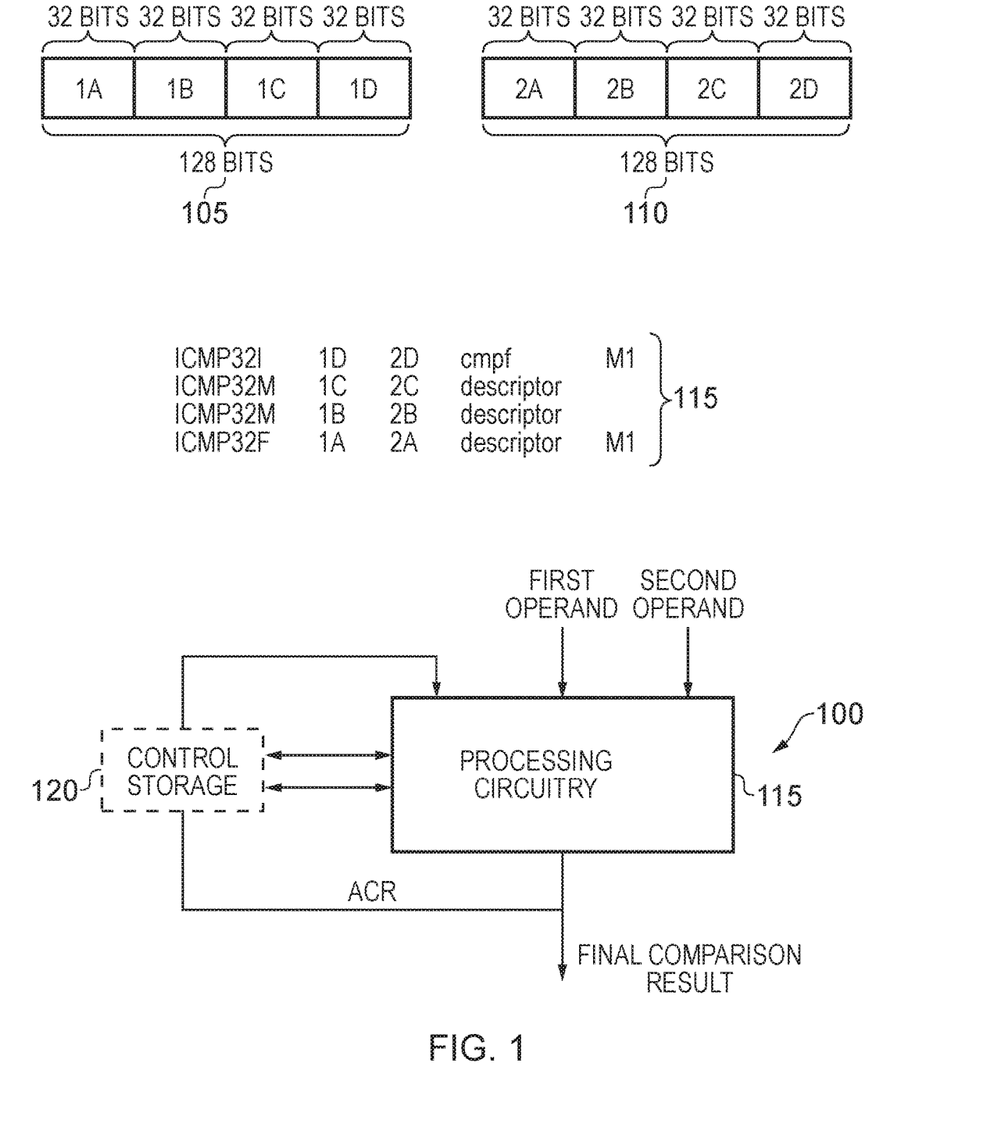
FIG. 1 shows, schematically, the operation of the present technique in accordance with one embodiment.

Particular embodiments will now be described with reference to the Figures. FIG. 1 illustrates an apparatus 100 for performing a comparison between two wide data types 105, 110. Each of these data types is 128 bits in length. The embodiment shown in FIG. 1, the processing circuitry 115 is only capable of operating on 32-bit values. Consequently, in order to compare two 128-bit values, the apparatus 100 performs a sequence of comparison instructions, each of which causes an associated comparison operation to be performed by processing circuitry 115. Each instruction in the sequence of instructions 115 considers a different 32 bits of the 128-bit values. For example, FIG. 1 shows how each of the 128-bit values 105, 110 can be separated into four 32-bit values (1A, 1B, 1C, 1D) and (2A, 2B, 2C, 2D). Each of the comparison instructions then compares an associated pair of 32-bit values (1A with 2A, 1B with 2B, 1C with 2C and 1D with 2D). The processing circuitry 115 therefore takes two operands as inputs together with an optional Accumulated Comparison Result (ACR). The ACR forms part of a descriptor which is output by a previous comparison operation. The format of the descriptor will be discussed later with reference to FIG. 5. In the embodiment shown in FIG. 1, the descriptor is provided as part of the comparison instruction. This may either involve the descriptor being passed in as a parameter of the instruction, or may instead be achieved by providing a reference to a storage location in which the descriptor is stored. However, in other embodiments, control storage 120 may be provided. In these other embodiments, the descriptor is not passed in as part of the comparison instruction but is instead accessed from a known location (the control storage 120) by the processing circuitry 115 during the comparison operation.

The embodiment shown in FIG. 1 comprises four comparison instructions. These start with an Initial Comparison Instruction (ICMP32I), followed by two chained comparison instructions (ICMP32M), followed by a final comparison instruction (ICMP32F). In the embodiment shown in FIG. 1, the first comparison instruction receives a comparison function (cmpf) as an input parameter. This indicates a comparison type to be performed. The comparison type indicates the type of comparison to be performed between the two 128-bit values. Examples of possible values for the comparison type will be discussed with reference to FIG. 3. The first comparison instruction also receives an output modifier (M1) as an input parameter. The output modifier is used to affect the final comparison result output at the end of the chain of comparison operations. In particular, it controls whether the result is an integer 1 or all 1's vector if the comparison result is true. If the result is false, the output is all 0's vector. Each of the comparison instructions except the first comparison instruction receives a descriptor as one of the input parameters. The format of the descriptor will be discussed with reference to FIG. 5.

Also as shown in the embodiment of FIG. 1, the output from the final comparison instruction is the final comparison result of comparing the two 128-bit values 105, 110. This final comparison result indicates the result of the comparison. The output is an all 0's vector (if the result of the comparison is false) or either an all 1's vector or the integer 1 (if the result of the comparison is true), dependent on the value of the output modifier (M1).

Figure 2:
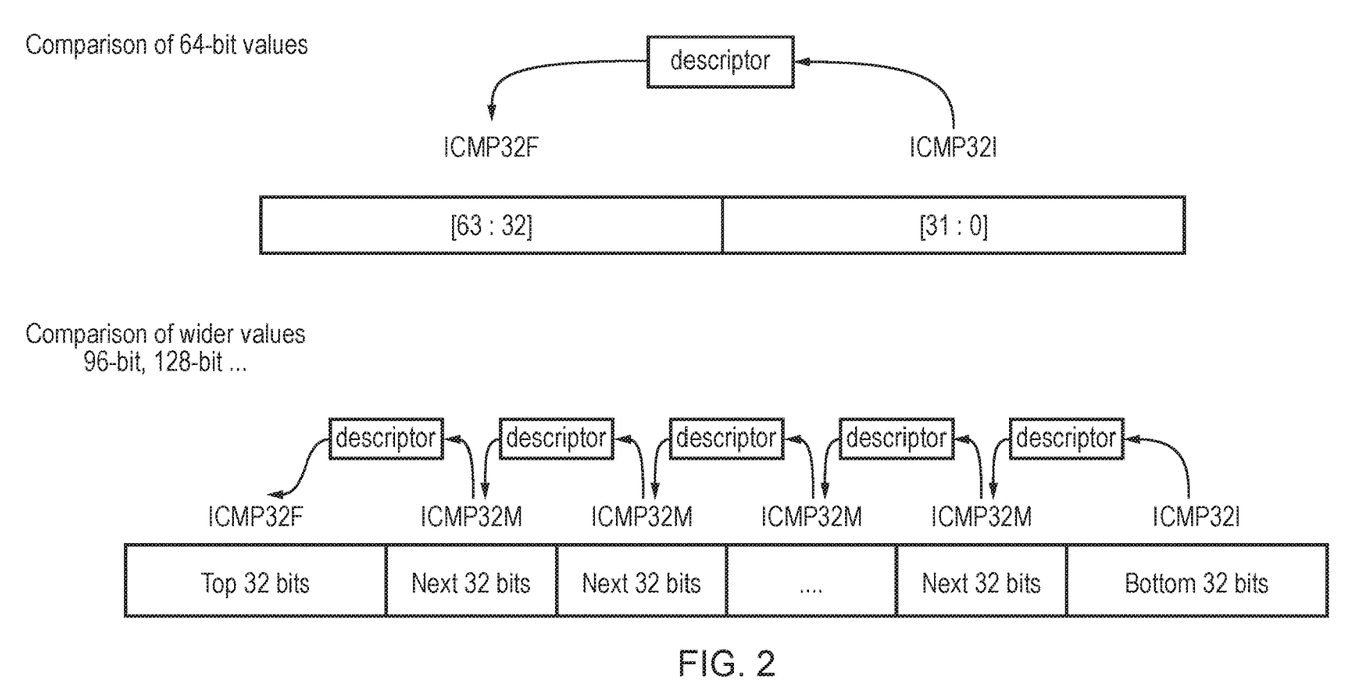
FIG. 2 shows how a number of comparison operations are chained together in order to provide the comparison of a wide data value in accordance with one embodiment.

FIG. 2 illustrates an example of chaining a plurality of comparison operations in order to achieve the comparison of a first value and a second value, whereby the first value and the second value are wide data types. In particular, in a system in which the first value and second value are each 64 bits and in which the processing circuitry 115 can compare a maximum of 32 bits at once, the comparison of the first value and the second value may be carried out by using an initial comparison instruction (ICMP32I) which causes processing circuitry 115 to perform a first or initial comparison operation on the first 32 bits of the first and second values and a final comparison operation on the last 32 bits of the first and second values. The result of the first comparison is a descriptor that is provided as an input to the second comparison instruction (ICMP32F). The output of the final comparison operation is the result of the comparison of the first value and second value.

If the first value and second value are wider than 64 bits, the chain may involve the inclusion of a chained comparison instruction (ICMP32M), which causes further comparison operations to be performed by the processing circuitry 115. These further comparison operations are termed "chained" comparison operations. Each of the chained comparison operations takes a descriptor provided by the previous comparison operation as an input. The result of the comparison operation results in an ACR being output, which forms part of the descriptor that is input to a subsequent comparison operation. In the embodiment shown in FIG. 2, it is assumed that the first and second values have a bit length that is a multiple of the number of bits that the processing circuitry 115 is able to compare at once. For example, in this case, the processing circuitry 115 is able to compare two sets of 32 bits at once. It is therefore assumed that the first and second values have a bit length that is a multiple of 32 bits. However, it will be appreciated that comparisons of other numbers of bits will be possible too. This may be achieved by extending the numbers to be compared. For example, if the first and second values are 100-bit values, an additional 28 bits may be provided such that the value is actually treated as a 128-bit value. For example, for a 100-bit unsigned value, 28 zeros may be added to the top bits in order to produce a 128-bit value for comparison.

Figure 3:
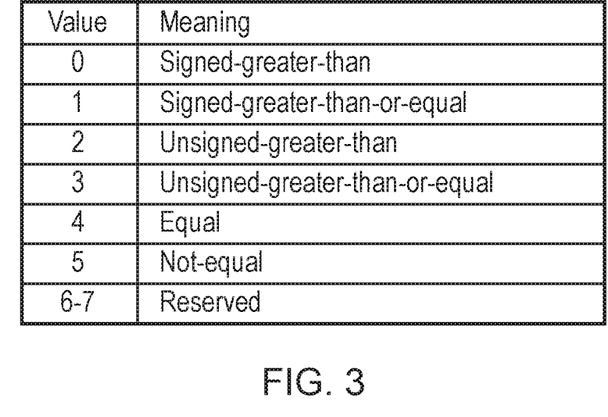
FIG. 3 is a table illustrating example values of a comparison function in accordance with one embodiment.

FIG. 3 shows a table illustrating an example of different values for the comparison function (cmpf) in accordance with one embodiment. As previously described, the comparison value indicates the type of comparison that is to be performed between the first value and the second value. In the case of the embodiment shown in FIG. 3, where the value of the comparison function is 0, the comparison will be a signed greater than function. Where the value is 1, the function will be a signed greater than or equal to function. Where the value is 2, the function will be an unsigned greater than function. Where the value is 3, the function will be an unsigned greater than or equal to function. Where the value is 4, the function will be for equality. Where the value is 5, the function will be for non-equality. The values 6 and 7 are reserved, for future use for example. As an example, if the first value being compared is 5 and the second value being compared is 12, then if the comparison function is 1, then the result will be 0 or false, because 5 is not greater than or equal to 12. Alternatively, if the value of the comparison function is 5, then the result will be 1 or true, because 5 is not equal to 12. Whether the function is a signed function or an unsigned function dictates whether or not the first value and the second value are to be treated as signed numbered or unsigned numbers.

Figure 4:
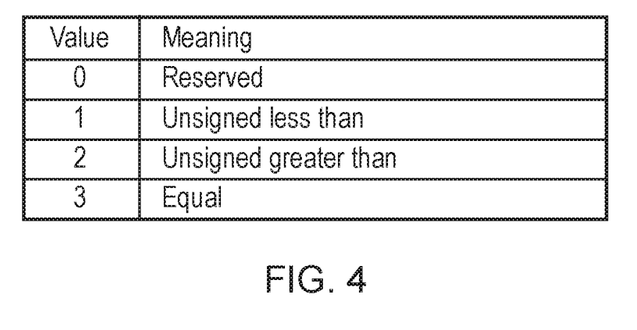
FIG. 4 shows an example cumulative result in accordance with one embodiment.

FIG. 4 shows a table comprising example values for the ACR. As previously described, the ACR indicates the result of comparing a subset of the bits of the first value and the second value. In other words, the ACR comprises the result of having compared all of the bits encountered so far. For example, if each comparison operation takes 32 bits from the first value and compares those to 32 bits of the second value, then the ACR in a third comparison operation will be the result of comparing the first 96 bits of the first value and 96 bits of the second value. If the value of the ACR is 1, then this means that the comparison so far indicates that the first value is less than the second value. If the value is 2 then this means that the comparison so far indicates that the first value is greater than the second value. If the value is 3 then this indicates that the comparison so far indicates that the first value and the second value are equal. The value 0 is reserved, for future use for example.

Figure 5:
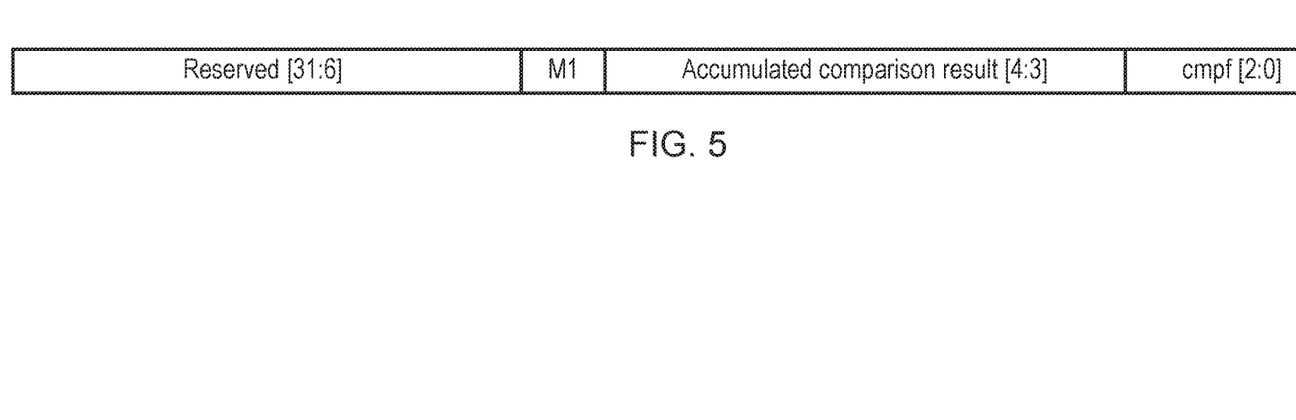
FIG. 5 illustrates an example descriptor in accordance with one embodiment.

FIG. 5 illustrates an example of the descriptor in accordance with one embodiment. The descriptor may be passed between comparison operations in order to chain the comparison operations together. For example, the output of one comparison operation may be provided as a parameter to a subsequent comparison operation. In the embodiment shown in FIG. 5, the descriptor is made up of 32 bits. The first 3 bits (0-2) comprise the comparison function (cmpf) as previously described with reference to FIG. 3. The following 2 bits (3-4) comprise the ACR, as previously described with reference to FIG. 4. The following bit (5) is used to store the output modifier (M1). This controls whether the result output at the end of the sequence of chained comparison operations is an integer 1 or all 1's vector if the comparison result is true. If the result is false, the output is an all 0's vector. The remaining bits (6-31) are reserved, for future use for example.

Figure 6:
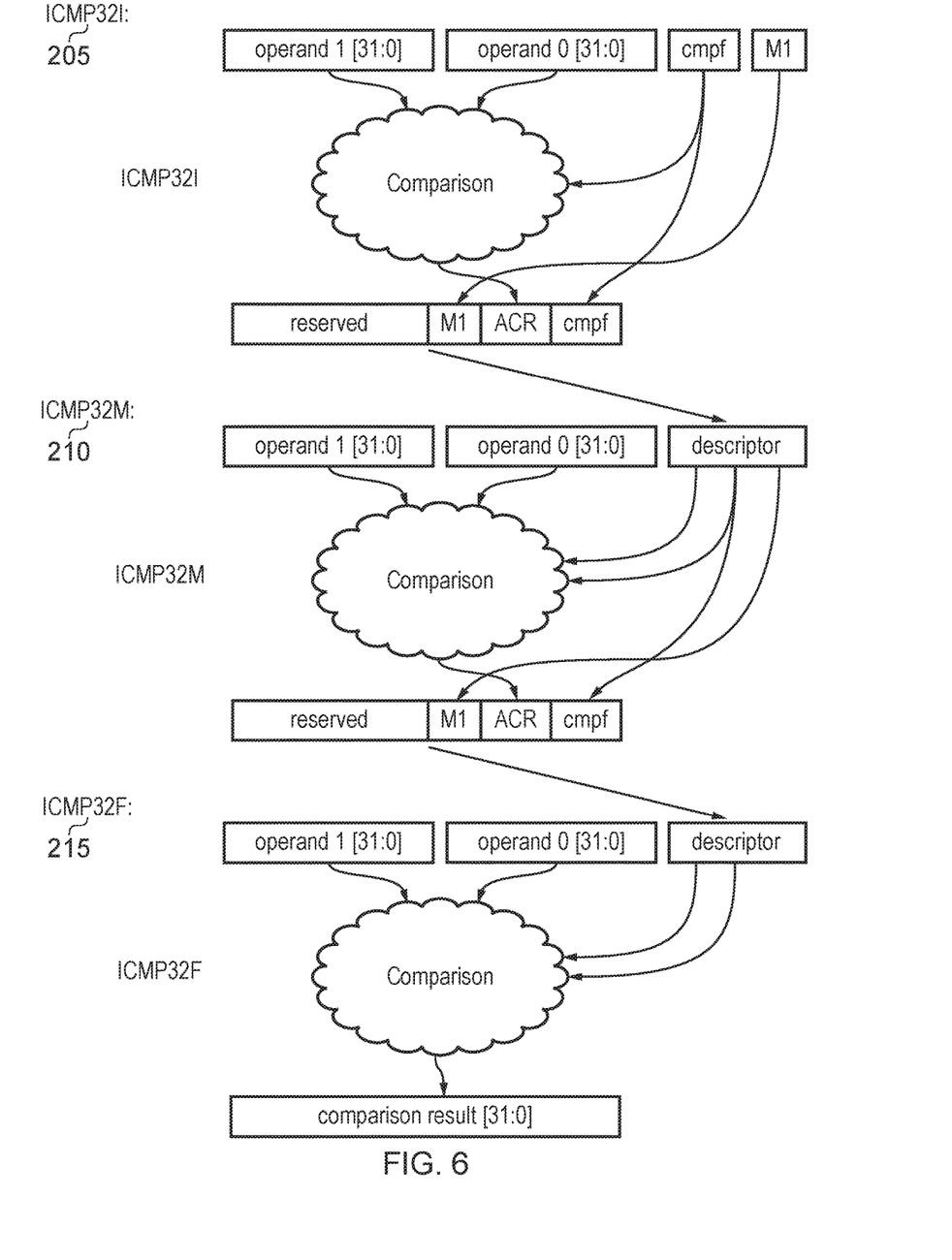
FIG. 6 gives an example of three different instructions being used in combination to perform a comparison of a wide data type.

FIG. 6 shows an example illustrating the use of three comparison instructions, causing a chain of three comparison operations to compare a first value and a second value, and thereby output a comparison result. The process starts with a first comparison instruction (ICMP32I) 205. This receives a pair of operands (operand 0 and operand 1), each of 32 bits. In practice, these may refer to two 32-bit registers, where the first 32 bits of the first value and the second value, respectively, are stored. The instruction also comprises the comparison function (cmpf). As previously discussed with reference to FIG. 3, this dictates how the first value and the second value are to be compared. Finally, the instruction comprises the output modifier (M1), which dictates how the output is to be formatted. The first comparison instruction 205 results in a comparison operation being performed between operand 0 and operand 1. The result is an ACR, which together with the output modifier (M1) and the comparison function (cmpf), make up a descriptor that is provided to a second comparison instruction (ICMP32M) 210. This second comparison instruction also takes a pair of operands (operand 0 and operand 1). Although these operands are also 32 bits each, they will be a different pair of operands than the pair of operands operated on by the first comparison instruction 205. Accordingly, the second comparison instruction 210 operates on a different set of bits to those of the first comparison instruction. The second comparison instruction 210 causes a second comparison operation to take place. The second comparison operation takes the pair of operands provided by the second comparison instruction 210. The second comparison operation also takes the comparison function (cmpf) and the ACR from the descriptor provided by the previous comparison operation. The result of performing the second comparison operation is an ACR, which together with the comparison function (cmpf) and the output modifier (M1) from the input descriptor, make up a new descriptor. This new descriptor is provided to a final comparison instruction (ICMP32F) 215. The final comparison instruction 215 causes a final comparison operation to be performed. The instruction comprises a pair of operands, which are again different to the pair of operands provided by the first comparison instruction 205 or the second comparison instruction 210. The third comparison instruction 215 also takes as an input the descriptor that is output as a result of performing the second comparison instruction 210, which includes the output modifier (M1). Once again, as a consequence of the comparison instruction 215, a comparison operation is performed on the pair of provided operands. The result of this is a comparison result, which is the overall result of comparing the first value with the second value (each of which is 96 bits in length).

Note that this embodiment makes use of an initial comparison instruction (ICMP32I) 205. However, in other embodiments, the first comparison instruction may be of the form illustrated by the second comparison instruction (ICMP32M) 210. In such embodiments, the descriptor provided to the first comparison instruction comprises an ACR that indicates that the bits compared so far are equal, which thereby has no effect on the first comparison operation.

In each case, the behaviour of the comparison operation should be clear. In each case, the comparison operation will consider the ACR that is provided as part of the input descriptor, in addition to performing a comparison on a subset of the bits of the first and second value in order to output a new ACR as part of an output descriptor.

If the comparison operations operate from least significant bit to most significant bit, then the output ACR will be the same as the input ACR if the input operands are equal. If the input operands are unequal, then the output ACR is set to the result of comparing the input operands. The behaviour of the final comparison instruction may be similar except that the ACR is not output. Instead, the ACR is used by the comparison function (cmpf) to determine whether or not the condition dictated by the comparison function is passed or not.

If the comparison operations operate from most significant bit to least significant bit, then the input ACR is provided as the output ACR if the input ACR indicates that the bits analysed so far are not equal. If the input ACR indicates that the bits analysed so far are equal, then the output ACR is set to the result of comparing the input operands.

Figure 7:
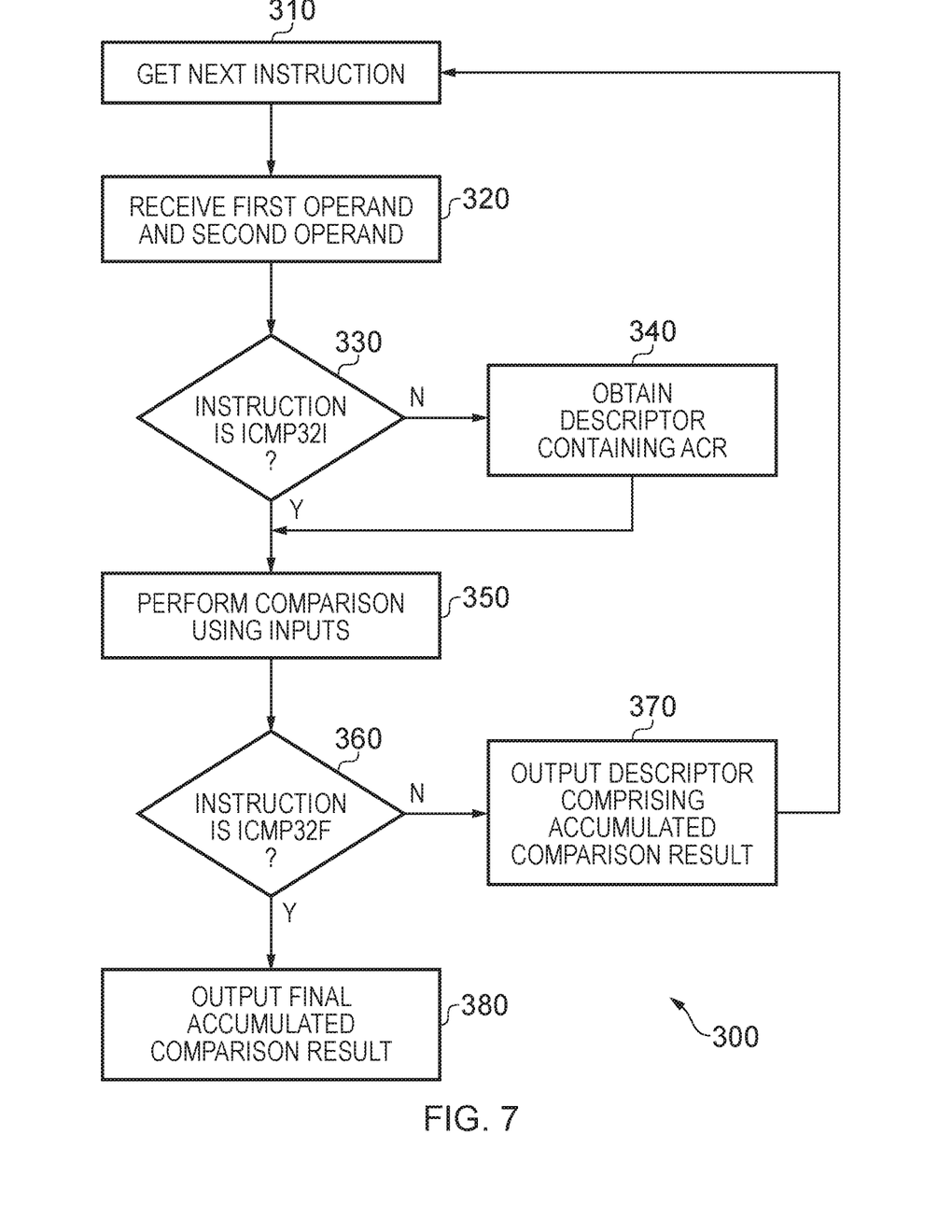
FIG. 7 illustrates a flow chart of a method for using the instructions illustrated in FIG. 6 for performing a comparison of a wide data type.

FIG. 7 illustrates a flowchart 300 indicating the general method for executing the comparison instructions. At step 310, the next instruction is fetched. At step 230, the first operand and the second operand are received. The operands may be provided directly or may be provided in storage locations (such as registers) that are referred to in one or more parameters of the instruction. In any event, at step 330, it is determined whether or not the instruction is an ICMP32I instruction. If not, then at step 340, the descriptor containing the ACR is obtained and flow continues to step 350. If at step 330, the instruction is an ICMP32I instruction, then flow proceeds directly to step 350. At step 350, the comparison operation is performed. At step 360, it is determined whether or not the instruction is an ICMP32F instruction. In other words, it is determined whether or not the instruction is a final comparison instruction in the sequence. If not, then an output descriptor is formed comprising the ACR from the comparison operation performed in step 350. Flow then proceeds to step 310 where the next instruction is fetched as previously described. The sequence therefore iterates through all of the instructions until at step 360, the final comparison instruction is reached. At this point, flow proceeds to step 380, where a final comparison result is output. The final comparison is dependant on the comparison function (cmpf), the result of the final comparison operation, and the result of the input ACR. The final comparison result may also be modified by the output modifier (M1).

Figure 8:
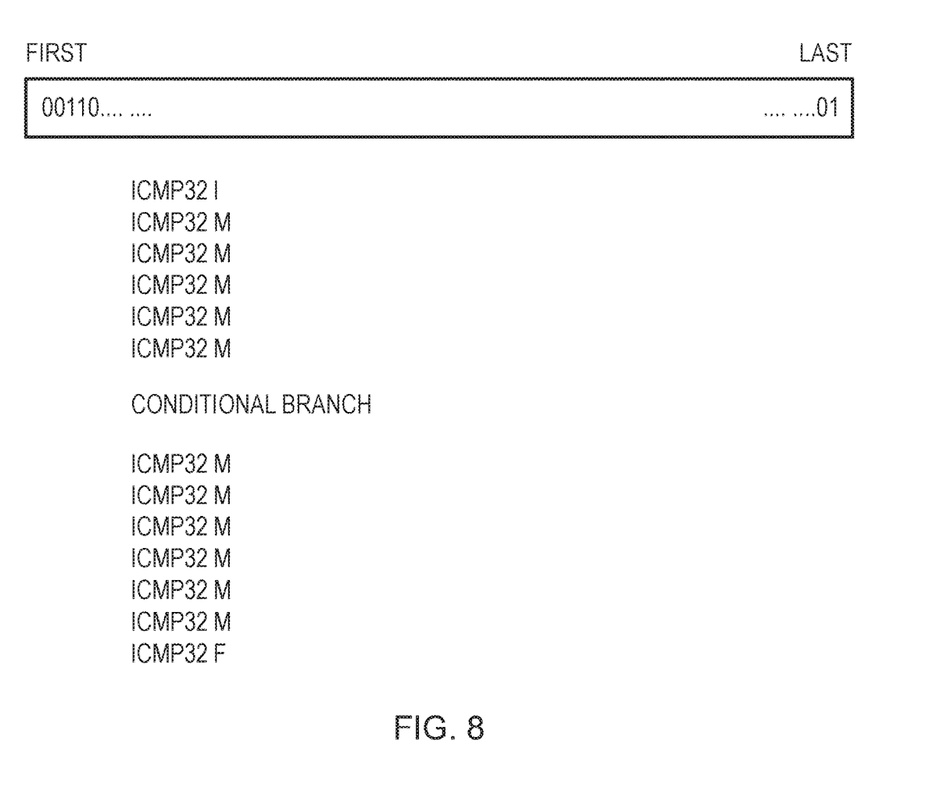
FIG. 8 is a diagram illustrating an example of early branching in accordance with one embodiment.

FIG. 8 shows an example of an early branch operation in a stream/sequence of comparison instructions. In FIG. 8, a large number of comparison instructions operate on different bits of a wide data type. The sequence of operations compares bits from the most significant bit to the least significant bit. Accordingly, it may be possible to determine the result of the comparison operation early. For example, as soon as the bits start to differ, it will be known which of the two values is larger or smaller and will also be known that the two values are non-equal. Accordingly, a conditional branch instruction, may be used in order to enable early branching and thereby prevent further comparisons of bits. The instruction stream shown in FIG. 8 therefore contains a conditional branch instruction part way through the stream in order to allow the later instructions to be bypassed if the comparison result is already known. The condition on which the branch occurs may be predetermined. For example, the branch instruction may cause a branch to occur in dependence on the equality (or lack thereof) of the bits examined so far. It will be appreciated, from the discussion of FIG. 6, that such a condition may make it possible to determine whether further comparisons of bits are necessary.

It must be noted that such a conditional branch instruction must be used with caution. In particular, as a consequence of branch prediction, it is possible that the wrong instructions may be chained comparison instruction pre-fetched. Where this happens, it may take a large number of processing cycles in order to correct for instructions that were prefetched due to an incorrect prediction. This is undesirable, as it can slow down the rate of instruction execution. Accordingly, the early branch instructions are best placed when a large number of comparison instructions follow, i.e. where there is a significant gain to potentially be made, and where there is a good chance that the result is already known, i.e. where there is less chance of misprediction occurring.

In some embodiments, a comparison instruction itself may perform the early branch operation, if appropriate. For example, if the number of remaining comparisons is known to a chained comparison instruction (ICMP32M) and if it is already known what the result of the comparison will be by virtue of the bits compared so far, then the chained comparison operation may branch to the end of the chain, thereby bypassing later instructions.

The present technique may be used in the comparison of two wide floating point numbers. The way in which this is achieved may depend on whether or not a TotalOrder comparison is to be performed or not. A TotalOrder comparison uses a defined total ordering for all floating point numbers. Ordinarily, values that are not-a-number (NaN) are treated as unordered and −0 and +0 are treated as being equal. However, a TotalOrder comparison will order these cases as well as handle other situations that may be particular to floating point number representations.

Figure 9:
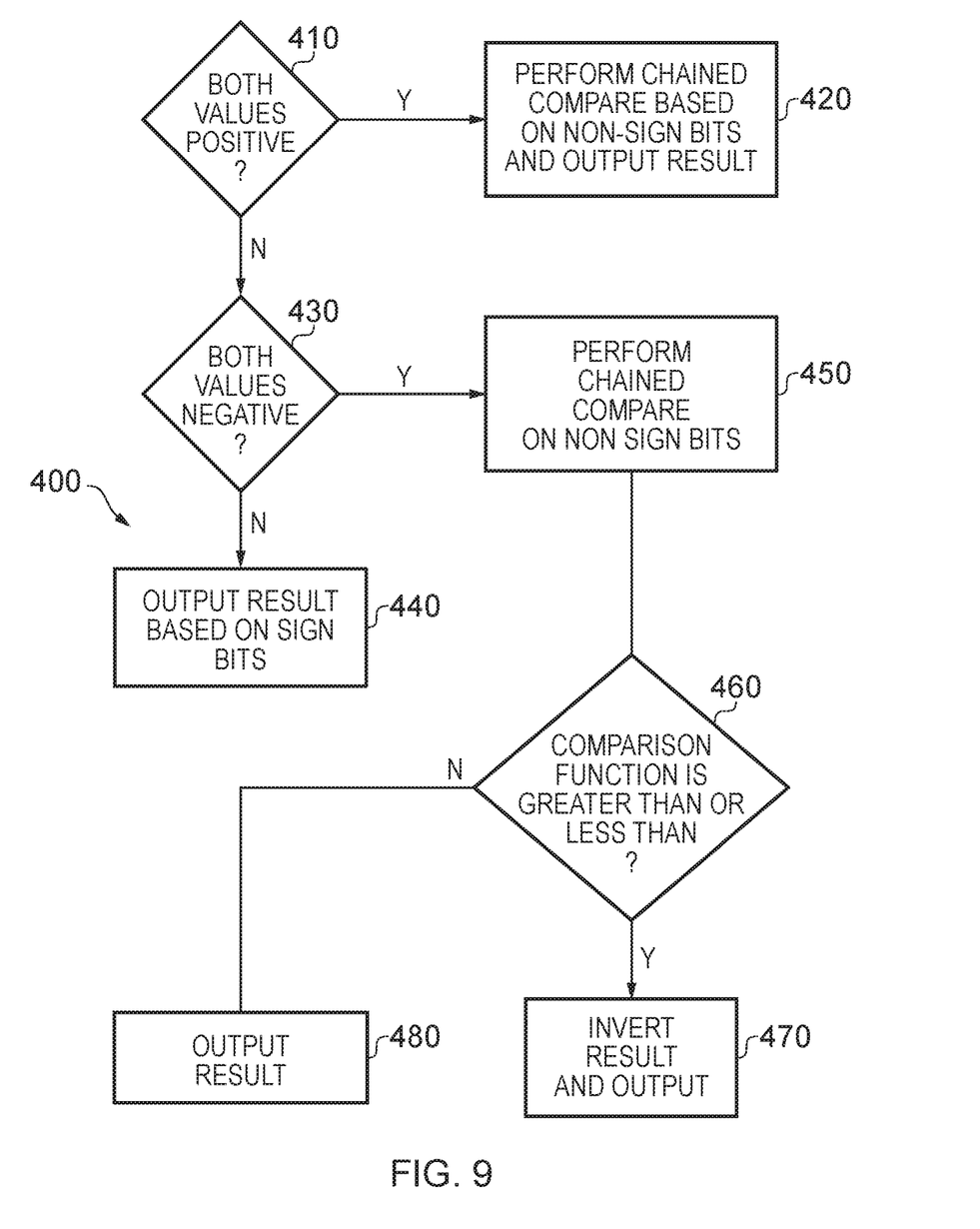
FIG. 9 illustrates a flow chart for performing a comparison of two wide floating point numbers.

FIG. 9 illustrates a flow chart 400 for performing a chained compare on two floating point numbers using a TotalOrder comparison. At step 410, it is determined whether or not both the values (the first value and the second value) are positive. If so, then at step 420, a chained compare operation is performed on the first value and the second value, excluding the sign bits, as already described. Otherwise, at step 430, it is determined whether or not both values are negative. If not, then at step 440, the result of the comparison is determined based on the sign bits alone. For example, based on the sign bits alone (which are different at this point), it can be determined that the values are unequal and therefore that one value (the positive value) is bigger than the other value (the negative value). Alternatively, if both values are negative at step 430, then at step 450 a chained comparison operation is performed on the non-sign bits, as previously described. Step 460 determines whether or not the comparison function (cmpf) involves the greater than or less than function (including the greater than or equal to function as well as the less than or equal to function). If so, then at step 470, the result is inverted and output. If not, then at step 480, the result is output directly.

For other types of comparison (i.e. not TotalOrder), it is necessary to keep track of whether the significand is zero or non-zero and whether the exponent is all zeros, all ones, or something else. In order to achieve this, it is therefore necessary to know where the boundaries between the sign, exponent, and significand are in the representation of the floating point number. By keeping track of this information, it is possible to determine whether a given value is zero (if both the exponent and significand are zero), infinity (if the exponent is all ones and the mantissa is zero), NaN (if the exponent is all ones and the mantissa is non-zero), or a normal number (otherwise). If both values are normal, or if one value is normal and the other is zero, or if one value is infinity and the other number is either normal or zero, then it is possible to perform a comparison as the same way illustrated in the flow chart of FIG. 9. Otherwise, two zeros are considered to be identical (in other words, negative zero and positive zero are considered to be the same), two infinities with the same sign are identical, two infinities with different signs are compared according to their signs (negative infinity is smaller than positive infinity), and any comparison involving a NaN fails.

If the comparison is performed from most significant bit to least significant bit then at the point where you cross from the exponent into the significand you have sufficient information to classify each number as normal, infinity, NaN, or potentially zero. All three bits can be tracked for each operand (significand zero/non-zero, exponent all zeros/all ones/other). However, it is sufficient to track two bits for each of the operands. When comparing exponents, track whether the exponent is all zeros, all ones, or other. When switching to comparing the significand, track whether the overall value is zero/infinity/NaN/normal.

If the comparison is performed from least significant bit to most significant bit, it is possible to do similar tracking, but determine the "significand zero/non-zero" bit first, then consider the exponent value in order to determine whether or not the floating point number is zero/infinity/NaN/normal.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to perform a plurality of comparison operations in order to compare a first value and a second value, each of the first value and the second value having a length greater than N bits, and each comparison operation operating on a corresponding N bits of the first and second values;
the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

2. An apparatus according to claim 1, wherein
the processing circuitry is arranged, for at least each comparison operation after a first comparison operation in the sequence, to receive a descriptor for use as an input for that comparison operation; and
the descriptor comprises the accumulated comparison result from a previous comparison operation in the sequence.

3. An apparatus according to claim 2, wherein
the processing circuitry is responsive to a plurality of comparison instructions to perform the plurality of comparison operations, at least each comparison instruction other than a first comparison instruction identifying the descriptor in an input parameter.

4. An apparatus according to claim 2, wherein
the processing circuitry is responsive to a plurality of comparison instructions to perform the plurality of comparison operations, each of the plurality of comparison operations other than the final comparison operation providing the accumulated comparison result for use as the input by the next comparison operation in the sequence by updating the descriptor stored in storage circuitry.

5. An apparatus according to claim 2, wherein
the plurality of comparison instructions includes a chained compare instruction; and
the processing circuitry is responsive to the chained compare instruction to perform an associated comparison operation in the sequence, the associated comparison operation using as inputs the N bits of the first and second values to be operated on, and an input descriptor, and the processing circuitry is arranged to output, as a result of the associated comparison operation, the descriptor to be used as an input for a subsequent comparison operation.

6. An apparatus according to claim 2, wherein
the plurality of comparison instructions includes a final chained compare instruction; and
the processing circuitry is responsive to the final chained compare instruction to perform the final comparison operation in the sequence, the final comparison operation using as inputs the N bits of the first and second values to be operated on, and an input descriptor, and the processing circuitry is arranged to output, as a result of the final comparison operation, a comparison result for a comparison of the first and second values.

7. An apparatus according to claim 2, wherein
the plurality of comparison instructions includes a first chained compare instruction; and
the processing circuitry is responsive to the first chained compare instruction to perform the first comparison operation, the first comparison operation using as inputs the N bits of the first and second values to be operated on, and the processing circuitry is arranged to output, as a result of the first comparison operation, the descriptor to be used as an input for a subsequent comparison operation.

8. An apparatus according to claim 2, wherein
a comparison function is provided as an input to the plurality of comparison operations, wherein the comparison function defines a type of comparison to be performed between the first value and the second value.

9. An apparatus according to claim 8, wherein
the comparison function is provided as an input to the first comparison operation; and
the descriptor provided for use as an input by each comparison operation other than the first comparison operation identifies the comparison function provided for use as an input to the first comparison operation.

10. An apparatus according to claim 8, wherein
the comparison function is provided for use as an input by the final comparison operation in the sequence.

11. An apparatus according to claim 1, wherein
the first value and the second value are both integers.

12. An apparatus according to claim 1, wherein
the first value and the second value are both floating point numbers.

13. An apparatus according to claim 1, wherein
the first value and the second value each have a length that is a multiple of N bits.

14. An apparatus according to claim 1, wherein
each comparison operation other than a first comparison operation in the sequence operates on more significant bits of the first and second values than the previous comparison operation.

15. An apparatus according to claim 1, wherein
each comparison operation other than a first comparison operation in the sequence operates on less significant bits of the first and second values than the previous comparison operation.

16. An apparatus according to claim 15, wherein
the processing circuitry is responsive to the accumulated comparison result indicating a predetermined condition to perform an early branch operation that causes subsequent comparison operations in the sequence to be bypassed.

17. An apparatus according to claim 16, wherein
the predetermined condition is based on whether the accumulated comparison result indicates equality of bits compared by previous comparison operations.

18. A method comprising the steps:
performing a plurality of comparison operations in order to compare a first value and a second value, each of the first value and the second value having a length greater than N bits, and each comparison operation operating on a corresponding N bits of the first and second values;
the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

19. An apparatus comprising:
processing means for performing a plurality of comparison operations in order to compare a first value and a second value, each of the first value and the second value having a length greater than N bits, and each comparison operation operating on a corresponding N bits of the first and second values;
the plurality of comparison operations being chained to form a sequence such that each comparison operation is arranged to output an accumulated comparison result incorporating the comparison results of any previous comparison operations in the sequence, and such that for each comparison operation other than a final comparison operation in the sequence the accumulated comparison result is provided for use as an input by a next comparison operation in the sequence.

* * * * *